US009191921B2

United States Patent
Kuzio et al.

(10) Patent No.: US 9,191,921 B2
(45) Date of Patent: Nov. 17, 2015

(54) METHOD AND APPARATUS FOR DETERMINING LOCATIONS OF COMMUNICATION DEVICES IN A SIMULCAST NETWORK

(75) Inventors: Piotr Kuzio, Krakow (PL); Waldemar K. Dworakowski, Warsaw (PL)

(73) Assignee: Motorola Solutions, Inc., Schaumburg, IL (US)

( * ) Notice: Subject to any disclaimer, the term of this patent is extended or adjusted under 35 U.S.C. 154(b) by 224 days.

(21) Appl. No.: 13/885,898

(22) PCT Filed: Dec. 1, 2010

(86) PCT No.: PCT/PL2010/000119
§ 371 (c)(1),
(2), (4) Date: May 16, 2013

(87) PCT Pub. No.: WO2012/074418
PCT Pub. Date: Jun. 7, 2012

(65) Prior Publication Data
US 2013/0244712 A1    Sep. 19, 2013

(51) Int. Cl.
*H04W 72/00*    (2009.01)
*H04W 72/04*    (2009.01)
*H04W 4/06*    (2009.01)
*H04W 64/00*    (2009.01)
*H04W 84/08*    (2009.01)

(52) U.S. Cl.
CPC .......... *H04W 72/005* (2013.01); *H04W 72/048* (2013.01); *H04W 4/06* (2013.01); *H04W 64/00* (2013.01); *H04W 84/08* (2013.01)

(58) Field of Classification Search
CPC ........... H04W 4/06; H04W 4/08; H04W 4/10; H04W 72/005; H04W 72/02; H04W 72/04; H04W 72/048; H04W 84/08
USPC ............... 455/518, 519, 509, 445, 51.2, 54.1, 455/67.1, 456.1, 404.2, 412.1, 517, 520, 455/414.1, 503, 564, 550.1, 566; 375/362, 375/329; 370/252, 342, 312, 352
See application file for complete search history.

(56) References Cited

U.S. PATENT DOCUMENTS 5,146,538 A * 9/1992 Sobti et al. ..................... 704/201
5,448,758 A * 9/1995 Grube et al. ................... 455/503

(Continued)

FOREIGN PATENT DOCUMENTS

EP    1638249 B1    10/2007
WO    2008101208 A1    8/2008

OTHER PUBLICATIONS

International Search Report and Written Opinion for International Patent Application No. PCT/PL2010/000119 mailed Aug. 18, 2011.

*Primary Examiner* — Tan Trinh
(74) *Attorney, Agent, or Firm* — Brian M. Mancini; Daniel R. Bestor (57) ABSTRACT

Methods and apparatuses are disclosed for identifying locations of communication devices in a simulcast network. A comparator sends a location request to communication devices in a simulcast network. The location request includes timeslot assignments for each talk group in the simulcast network. The comparator receives responses from the communication devices. Each response is received in a timeslot assigned to a talk group. The comparator assigns network resources to talk groups in the simulcast network based at least in part on the received responses.

20 Claims, 5 Drawing Sheets

(56) References Cited

U.S. PATENT DOCUMENTS

| | | | |
|---|---|---|---|
| 5,485,632 A * | 1/1996 | Ng et al. | 455/503 |
| 5,535,431 A * | 7/1996 | Grube et al. | 455/411 |
| 5,542,099 A * | 7/1996 | Grube et al. | 455/503 |
| 5,566,181 A * | 10/1996 | Huang et al. | 370/312 |
| 5,973,643 A * | 10/1999 | Hawkes et al. | 342/457 |
| 6,044,069 A * | 3/2000 | Wan | 370/311 |
| 6,253,091 B1 * | 6/2001 | Naddell et al. | 455/519 |
| 6,545,995 B1 | 4/2003 | Kinnunen et al. | |
| 6,728,226 B1 | 4/2004 | Naito | |
| 6,959,199 B2 | 10/2005 | Ohkubo et al. | |
| 7,221,660 B1 * | 5/2007 | Simonson et al. | 370/312 |
| 7,400,861 B2 | 7/2008 | Terry | |
| 8,213,371 B1 * | 7/2012 | Prock et al. | 370/329 |
| 2003/0017836 A1 * | 1/2003 | Vishwanathan et al. | 455/517 |
| 2003/0207690 A1 * | 11/2003 | Dorenbosch | 455/445 |
| 2004/0196793 A1 * | 10/2004 | Lucidarme et al. | 370/252 |
| 2004/0198376 A1 * | 10/2004 | Chandhok et al. | 455/456.1 |
| 2004/0203793 A1 * | 10/2004 | Dorenbosch | 455/445 |
| 2005/0227722 A1 * | 10/2005 | Harris et al. | 455/518 |
| 2006/0268882 A1 | 11/2006 | Mademann | |
| 2007/0036100 A1 * | 2/2007 | Shaffer et al. | 370/328 |
| 2007/0184862 A1 * | 8/2007 | Hartless | 455/503 |
| 2007/0232242 A1 * | 10/2007 | Dunko | 455/90.2 |
| 2008/0242312 A1 * | 10/2008 | Paulson et al. | 455/456.1 |
| 2008/0299940 A1 * | 12/2008 | Shaffer et al. | 455/404.2 |
| 2010/0086092 A1 * | 4/2010 | Wiatrowski et al. | 375/362 |
| 2010/0189048 A1 | 7/2010 | Baker et al. | |
| 2010/0261477 A1 | 10/2010 | Duran et al. | |
| 2013/0210476 A1 * | 8/2013 | Zhou et al. | 455/518 |

\* cited by examiner

METHOD AND APPARATUS FOR DETERMINING LOCATIONS OF COMMUNICATION DEVICES IN A SIMULCAST NETWORK

This application claims priority to PCT Application Serial Number PCT/PL2010/000119 filed Dec. 1, 2010, the contents of which are expressly incorporated herein by reference in their entirety.

FIELD OF THE DISCLOSURE

The present disclosure relates generally to assigning base radios to talk groups in a simulcast network and more particularly to continuously monitoring locations of communication devices to efficiently assign network resources to each talk group.

BACKGROUND

Institutional organizations, such as public safety organizations, typically use simulcast networks for voice communications. A simulcast radio network is a radio network in which all network components are active on the same radio frequency channel at the same time. In simulcast radio networks, mobile devices, for example portable two-way radios, mobile radios, or other similar radios, communicate with each other and with a centralized dispatch center through base radios/stations. Signals transmitted from each radio are received by multiple base radios and simulcast radio network 100 is configured to select a desired base radio signal for processing. In order to efficiently use network resources, each radio in the network may be associated with one or more talk groups.

To split common network resources between two or more talk groups that operate on the same access channel, each talk group is located in a unique geographical area in the network coverage area. Each talk group is also assigned a unique network access code, wherein radios in each talk group are programmed to suppress audio input/output that does not include the unique network access code. For example, radios for firefighters may be associated with a firefighter talk group which is located in, for example, the northern coverage area in simulcast radio network 100. The radios in the firefighter talk group may therefore be configured to communicate through base radios in the northern coverage area of simulcast radio network 100. Radios for police officers in the same simulcast radio network may be associated with a police talk group which is located in another geographical coverage area, for example, the southern coverage area in simulcast radio network 100. As such, the radios in the police talk group may be configured to communicate through base radios in the southern coverage area of simulcast radio network 100. Because the talk groups are in different geographical locations, there should be no interference between the talk groups. In order to efficiently configure and modify talk groups and to assign adequate network resources to each talk group, it is useful to identify the locations of radios associated with each talk group.

Accordingly, there is a need for a method and apparatus for continuously monitoring locations of radios in talk groups.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Embodiments are directed to methods and apparatuses for identifying locations of communication devices in a simulcast network. A comparator sends a location request to communication devices in a simulcast network. The location request includes timeslot assignments for each talk group in the simulcast network. The comparator receives responses from the communication devices. Each response is received in a timeslot assigned to a talk group. The comparator assigns network resources to talk groups in the simulcast network based at least in part on the received responses.

Figure 1:
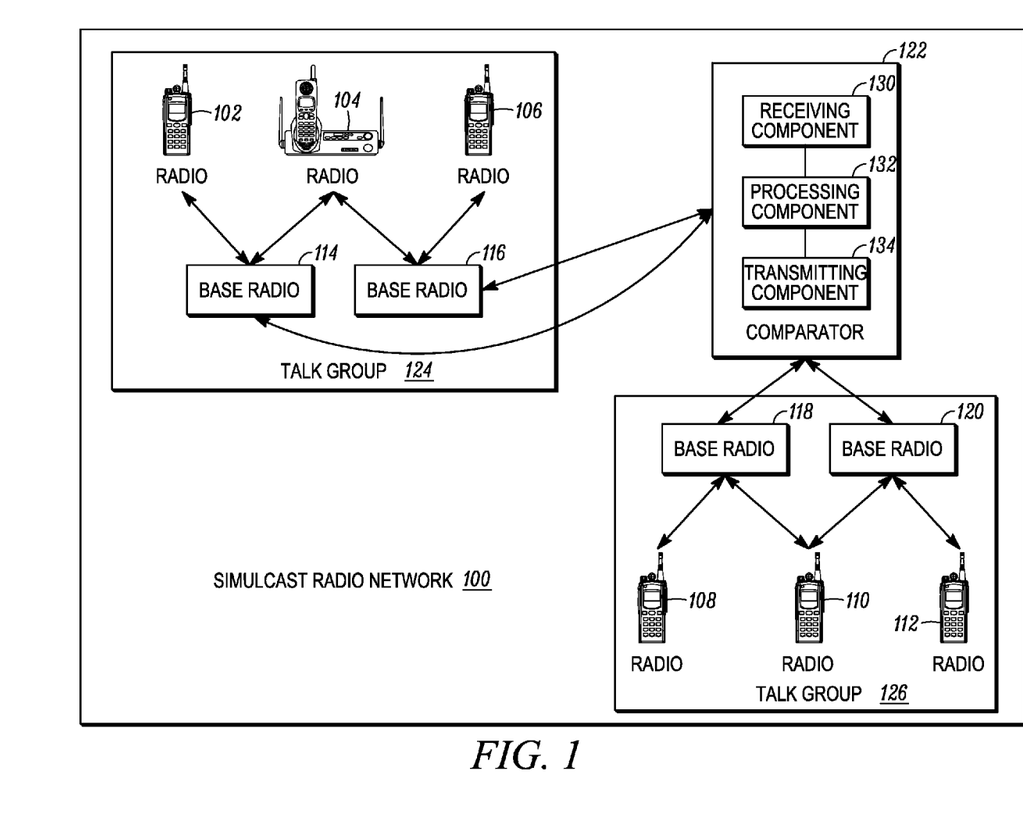
FIG. 1 is a block diagram of a simulcast radio network used in accordance with some embodiments.

FIG. 1 is a block diagram of a simulcast radio network used in accordance with some embodiments. Simulcast radio network 100 includes communication devices, such as radios 102-112, which may be, for example portable two-way radios, mobile radios, or other similar radios. Simulcast radio network 100 also includes base stations or base radios 114-120, each of which is configured to receive signals transmitted from one or more radios 102-112. Radios 102-112 and base radios 114-120 are configured to operate on the same radio frequency channel and they may operate according to, for example, the Association of Public Safety Communications Officials International (APCO) Project 25 (P25) standard, the Terrestrial Trunked Radio (TETRA) protocol, or similar radio protocol. Further details regarding the P25 standards can be obtained from the Telecommunications Industry Association, 2500 Wilson Boulevard, Suite 300 Arlington, Va. 22201 and regarding the TETRA standards may be obtained by contacting ETSI at ETSI Secretariat, 650, Route des Lucioles, 06921 Sophia-Antipolis Cedex, FRANCE. Each radio 102-112 is assigned to a specific talk group and one or more base radios 114-120 are assigned to each talk group. For example, radios 102-106 are assigned to a first talk group 124 and radios 102-106 are configured to communicate through base radios 114-116. Radios 108-112 are assigned into a second talk group 126 and radios 108-112 are configured to communicate through base radios 118-120. Signals transmitted from each radio 102-112 are detected by the appropriate base radios 114-120 and a comparator 122 ensures that the best possible voice signal is broadcast by combining the best parts of a single signal that has been received by two or more base radios 114-120. Comparator 122 therefore enhances received audio quality in weak signal areas by selecting and mixing inputs from multiple base radios 114-120. It should be noted that although comparator 122 is illustrated as a stand-alone device, the functions performed by comparator 122 can be performed alternatively by one or more base radios 114-120. In addition, one or more other infrastructure elements in simulcast radio network 100 can perform the functions performed by comparator 122.

In some embodiments, a talk group 124 or 126 may be a voice talk group, a data talk group, or a combination talk group (a voice and data talk group). The voice talk group may process voice calls and the data talk group may process data, for example text messages, or control channel activities. The control channel activities may be used to, for example improve performance and channel load for selected talk groups. The combination talk group may process conventional voice/data calls in some geographical areas of the talk group coverage area and process voice/data/control activities in other geographical areas of the talk group coverage area.

In order to split common resources between two or more talk groups, for example the first talk group 124 and the second talk group 126 that use the same radio frequency channel, each talk group is geographically separated to avoid signal interference between the talk groups. Accordingly, comparator 122 is configured to identify the locations of radios 102-112 in order to determine how to assign radios 102-112 to appropriate talk groups on the same radio frequency channel. Upon locating radios in simulcast radio network 100, comparator 122 may also disable one or more base radios 114-120 or remove the base radio from the talk group if comparator 122 determines that the base radios are not being used by assigned talk groups. On the other hand, upon locating radios in simulcast radio network 100, comparator 122 may also enable one or more base radios 114-120 if comparator 122 determines that more base radios need to be assigned to a talk group.

In some embodiments, comparator 122 includes a transmitting component 134, a processing component 132 and a receiving component 130. Although illustrated for simplicity purposes as individual components, it will be appreciated by those of ordinary skill in the art that other configurations performing the same functionality may be implemented. Transmitting component 134 periodically sends a location request to radios 102-112 through base radios 114-120. For example, comparator 122 may send the location request after a period of time, after every call, or when comparator 122 determines that an immediate location update is required. The location request may be a Trunked Signaling Block (TSBK) message, that is, a single block control channel message. The TSBK message may be, for example, a location identification message which requests location information from all radios 102-112 or a predefined group of radios in simulcast radio network 100. To ensure that the request is reliably received, transmitting component 134 may send location identification messages two or more times within a predefined time period. Upon receiving the location identification messages, each base radio 114-120 transmits the received location identification messages to associated radios. For example, base radios 118 and 120 transmit the location identification messages to radios 108-112 and base radios 114-116 transmit the location identification messages to radios 102-106.

The location identification messages sent from comparator 122 includes a list of network access codes, where each network access code is unique and is assigned to one talk group. The radios in each talk group are programmed to suppress audio input/output that does not include the unique network access code for their talk group. The location identification messages also include a timeslot assignment for each talk group, such that each radio is configured to transmit its response to the location identification messages in the timeslot assigned to its talk group. At a predetermined time after the radios received the location identification messages, each radio 102-112 responds to the location identification messages. In some embodiments, the response is a short symbol stream that may be a pseudorandom Compatible 4-Level FM version of Quadrature phase-shift keying (QPSK) c-modulation (C4FM) symbol stream, in order to mitigate radio frequency wave elimination. Because the radios are configured to transmit the C4FM symbol stream during a predetermined period after receiving the location identification messages, radios 102-112 may transmit C4FM symbol streams at the same time or at close to the same time.

When base radios 114-120 receive responses from radios 102-112, base radios 114-120 are configured to send the responses to receiving component 130 in comparator 122. Base radios 114-120 send the response from each radio if a received signal strength indicator (RSSI) or another parameter for indicating signal quality for the radio is above a predefined threshold. For example, base radios 114-116 are configured to send responses for talk group 124 if the RSSI for radios 102-106 is above one hundred and ten decibels (110 dBm). The responses from each radio are sent in the timeslot assigned to the radio talk group.

In other embodiments, comparator 122 may also send a present request, to selected talk group(s), in the location identification messages. For example, comparator 122 may send a present request to only talk group 124. In response to the present request, each radio in talk group 124 transmits a signal in the timeslot assigned to talk group 124. This signal can be thought of a "present" signal which indicates that radios in talk group 124 are active in simulcast radio network 100. When base radios 114-116 receive the present signals from radios in talk group 124, base radios 114-120 send messages to comparator 122 to indicate that responses were received in the timeslot assigned to talk group 124. Base radios 114-120 send the responses to comparator 122 if the signal quality indicator for radios in talk group 124 is above the predefined threshold.

Upon receiving responses to the location identification messages, processing component 132 in comparator 122 can determine whether a talk group may be further divided into more talk groups. If a split is possible, comparator 122 can begin preparation for the split for selected talk group pairs. For example, comparator 122 can begin to perform Ethernet port allocation for selected talk group pairs. Processing component 132 can also determine whether one or more base radios are being used and, if a base radio is not being used, the base radio can be removed from the talk group. Processing component 132 can determine that a base radio is not being used if, for example, it does not receive a response to the location identification messages from the base radio.

Figure 2:
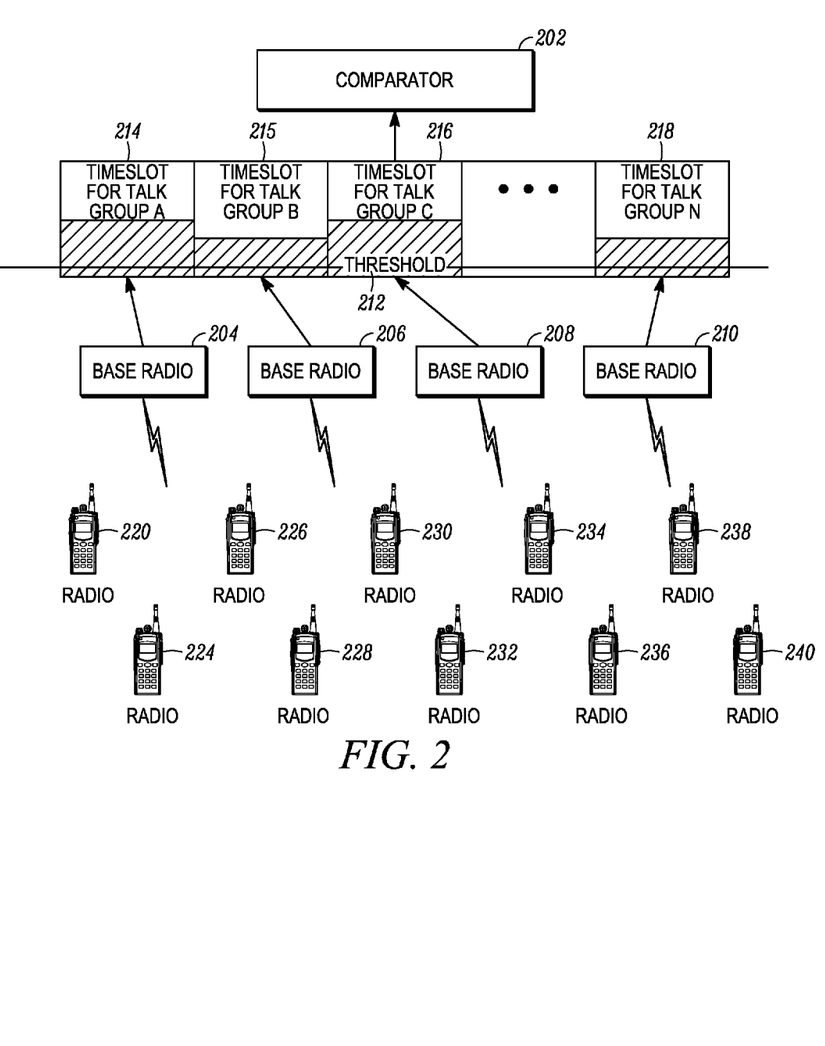
FIG. 2 is a block diagram illustrating a system in which a comparator obtains location information from radios in accordance with some embodiments.

FIG. 2 is a block diagram illustrating a system in which a comparator obtains location information from radios in accordance with some embodiments. Comparator 202 is configured to send a location identification message to base radios 204-210. Comparator 202, for example, may be comparator 122 of FIG. 1. Each location identification message identifies a talk group and/or a network access code associated with a talk group. Each location identification message also identifies a timeslot 214-218 assigned to each talk group. To ensure that the location identification message is reliably received, comparator 202 may send the location identification message two or more times within a predefined time period.

Each base radio 204-210 transmits the location identification messages to associated radios 220-240. Each radio 220-240 responds to the location identification messages by transmitting a short pseudorandom C4FM symbol stream 212 in its assigned timeslot 214-218. When base radios 204-210 receive the responses from radios 220-240, base radios 204-210 send responses for each talk group to comparator 202 if a signal quality parameter, such as the RSSI for radios in the talk group is above a predefined threshold 212. The shaded area in each time slot denotes the responses sent from base radios 204-210. Comparator 202 can use the responses from base radios 204-210 to identify the number of talk group members in each talk group and to configure or modify talk groups.

Figure 3:
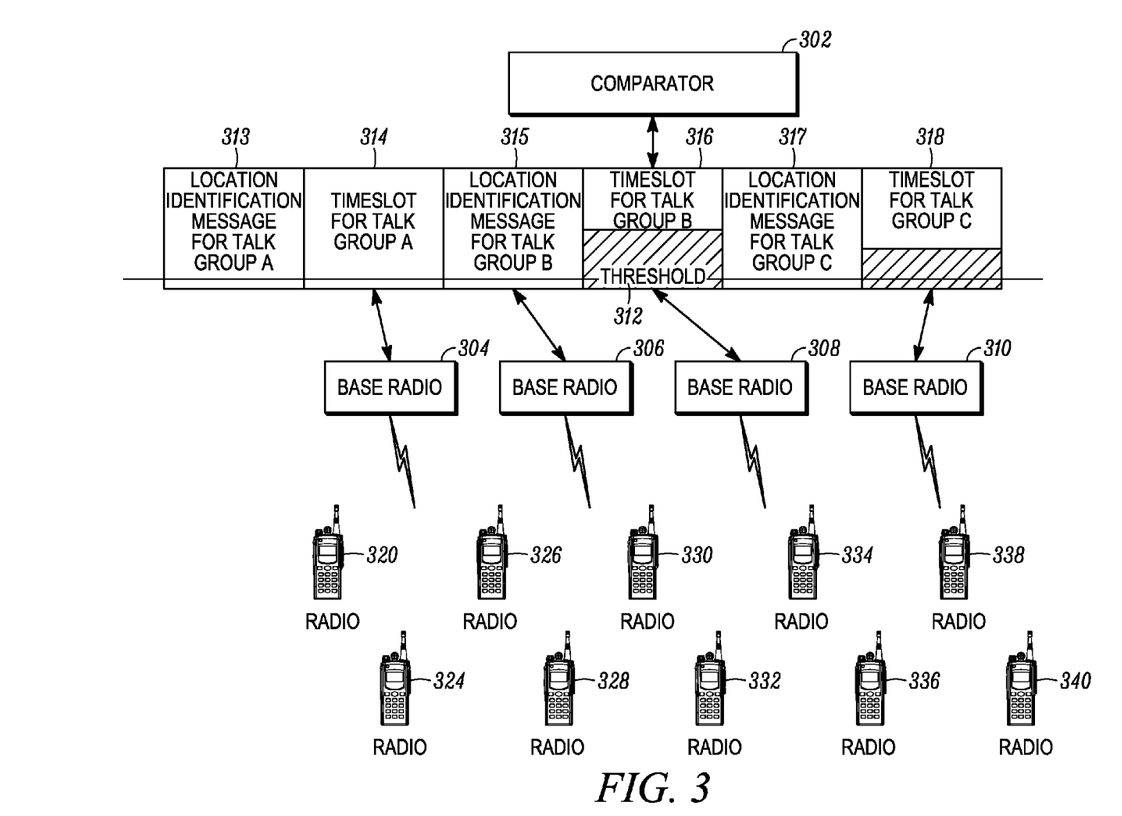
FIG. 3 is another block diagram illustrating a system in which a comparator obtains location information from radios in accordance with some embodiments.

FIG. 3 is another block diagram illustrating a system in which a comparator obtains location information from radios in accordance with some embodiments. Comparator 302 is configured to send a location identification message to base radios 304-310. Each location identification message 313, 315 and 317 is directed to specific talk group(s) and identifies the talk group and/or a network access code associated with the talk group. Each location identification message 313, 315 and 317 also identifies the timeslot 314, 316 and 318 associated with the talk group. Upon receiving the location identification message, each base radio 304-310 is configured to send out the location identification message in the timeslot assigned to the talk group.

Radios in the talk group(s) specified in the location identification messages respond to the location identification messages by transmitting a present signal in the assigned timeslot 314, 316 and 318. The shaded areas in timeslots 316 and 318 denote responses from radios in the specified talk group. In FIG. 3, base radios 304-310 did not receive any responses to the location identification messages transmitted to talk group A. Accordingly, base radios 304-310 did not transmit any present signals (as denoted by the lack of shaded areas) in timeslot 314 to comparator 302. Base radios 304-310 did receive responses to the location identification messages transmitted to talk group B and talk group C. Accordingly, base radios 304-310 transmitted present signals (as denoted by the shaded areas) in timeslots 316 and 318. When base radios 304-310 receive the responses from radios 330-340, base radios 304-310 send responses for the specified talk group 330-340 to comparator 302, if a signal quality parameter, such as the RSSI for radios in the specified talk group is above a predefined threshold 312. Comparator 302 can use the answers from base radios 304-310 to identify the number of subscribers in the specified talk group(s) and to modify the specified talk group(s). Using the example in FIG. 3, comparator 302 may disable base radios assigned to talk group A because no radios are active in that talk group.

The composition of talk groups may change as radios are added to or removed from talk groups. There are circumstances where the comparator may need to be notified of changes in a talk group without using the location identification messages. For example, if during continuous base radio transmissions a radio moves from one geographical location to another, the comparator will be unable to transmit location identification messages and will therefore be unaware of the location of the radio. In order for the comparator to remain continuously informed about each talk group's composition, in some embodiments, the simulcast network is divided into sub-sites. Each talk group is assigned to a group of adjacent sub-sites. Bordering sub-sites, which are adjacent to the group of sub-sites assigned to a talk group but which are not part of the group of sub-sites assigned to the talk group, may be used to alert comparator about radios leaving a talk group coverage area.

Figure 4:
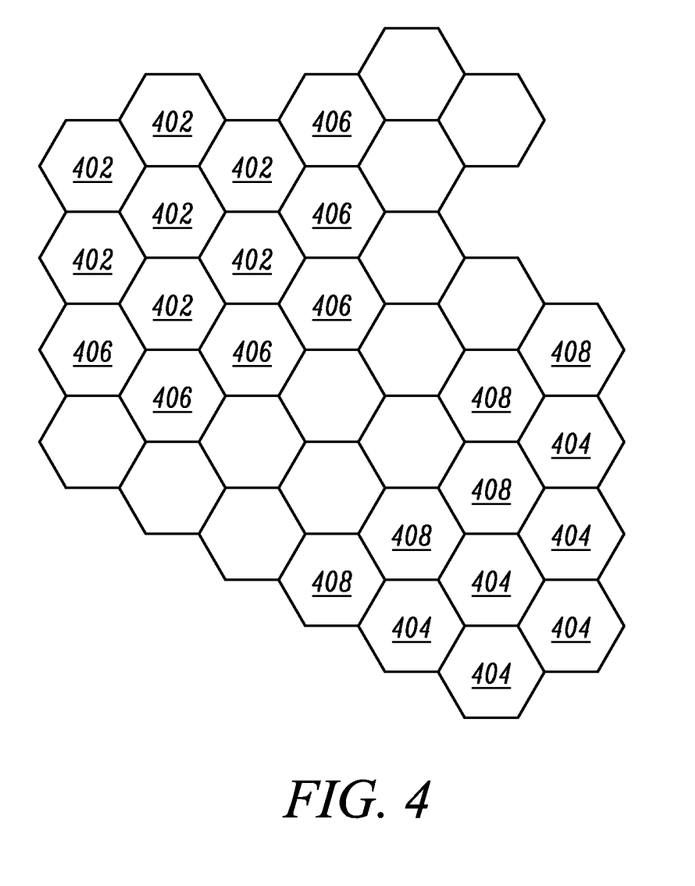
FIG. 4 is a block diagram illustrating a system in which sub-sites are used in accordance with some embodiments.

FIG. 4 is a block diagram illustrating a system in which sub-sites are used in accordance with some embodiments. Based on responses to location identification messages, each talk group may be assigned to specific sub-sites. For example, a first talk group may be assigned to sub-sites labeled 402 and a second talk group may be assigned to sub-sites labeled 404. Adjacent sub-sites to each set of sub-sites are identified as border sub-sites. For example, sub-sites labeled as 406 are border sub-sites for sub-sites 402. Similarly, sub-sites labeled as 408 are border sub-sites for sub-sites 404. Those sub-sites which are not labeled are not assigned to any talk groups. Base radios in border sub-sites 406 and 408 may be configured to receive and/or transmit different status symbols when there are no radios transmitting from sub-sites 406-408. The status symbols may be an error protected code that is spread across few status symbol bits. It should be noted that in some embodiments, sub-sites 406 and 408 may be configured to receive and/or transmit information other than status symbols. The status symbol may be transmitted from the comparator to determine if there is any radio activity in border sub-sites 406 and 408. The comparator may use responses to the status symbols from border sub-sites 406 and 408 when modifying talk group assignments. Base radios in border sub-sites 406 and 408 may also transmit the status symbol to inform the radios in sub-site 402 or 404 that are approaching sub-site 406 or 408 that sub-site 406 or 408 is a border sub-site.

Figure 5:
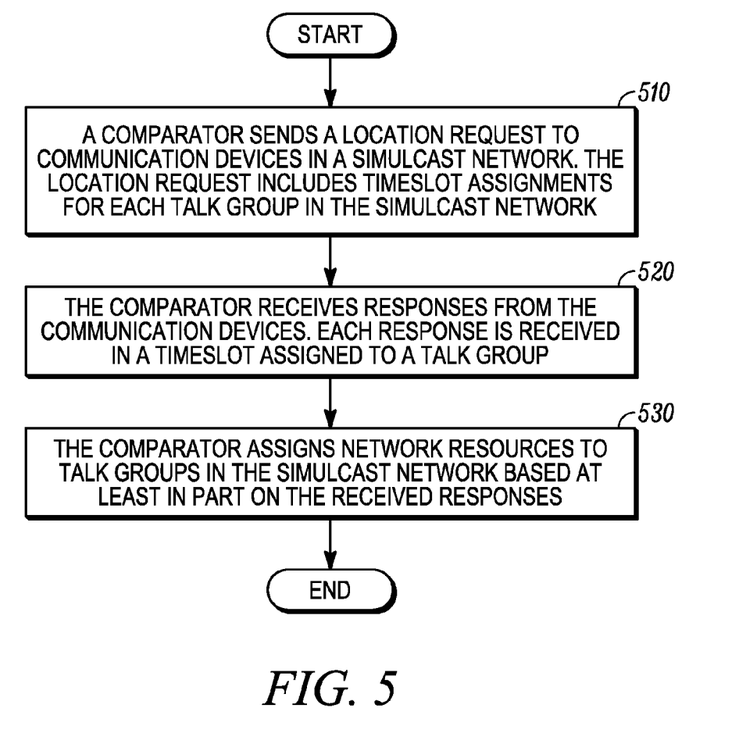
FIG. 5 is a flowchart of a method for continuously monitoring locations of radios in talk groups in accordance with some embodiments.

FIG. 5 is a flowchart of a method for continuously monitoring locations of radios in talk groups in accordance with some embodiments. In 510, a comparator sends a location request to communication devices in a simulcast network. The location request includes timeslot assignments for each talk group in the simulcast network. In 520, the comparator receives responses from the communication devices. Each response is received in a timeslot assigned to a talk group. In 530, the comparator assigns network resources to talk groups in the simulcast network based at least in part on the received responses.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for identifying locations of communication devices and correspondingly assigning talk groups to maximize network resource reuse in a simulcast network, comprising:
   sending, by a comparator, a location request to a plurality of communication devices in a simulcast network, wherein the location request includes timeslot assignments for each talk group of a plurality of talkgroups in the simulcast network;
   receiving, by the comparator, responses from each of the plurality of communication devices indicating a location of the communication device, each response being received in a timeslot assigned to a respective one of the plurality of talk groups with which the communication device is associated; and
   assigning, by the comparator, a common network resources to two or more of the plurality of talk groups determined to be geographically separated in the simulcast network based at least in part on the received responses.

2. The method of claim 1, wherein the talk group is at least one of a voice talk group, a data talk group or a combination talk group.

3. The method of claim 1, wherein the sending comprises sending a network access code for each talk group in the location request and a single block control channel message to base radios for further transmission to the communication devices.

4. The method of claim 1, wherein the sending comprises sending a present request in the location request to selected talk groups.

5. The method of claim 4, wherein the receiving comprises receiving a present signal from communication devices in each selected talk group, wherein each present signal is received in a timeslot associated with the selected talk group.

6. The method of claim 1, wherein the receiving comprises receiving responses from communication devices associated with each talk group when a signal strength indicator from the communication devices is above a predefined threshold.

7. The method of claim 1, wherein the receiving comprises receiving a short symbol stream from each communication device.

8. The method of claim 1, wherein the receiving comprises receiving responses from the communication devices at close to the same time.

9. The method of claim 1, wherein the assigning further comprises using the responses to determine that one or more particular base radios are not being used by any of the communication devices associated with a particular talk group assigned to the one or more base radios, and responsively disabling the one or more particular base radios.

10. The method of claim 1, wherein a network coverage area for the simulcast network is divided into sub-sites, wherein one or more of each sub-site is assigned to a talk group.

11. The method of claim 10, further comprising sending, by the comparator, status symbols to base radios in sub-sites bordering the one or more sub-sites assigned to the talk group.

12. The method of claim 11, wherein the status symbols are further transmitted to communication devices entering the bordering sub-sites.

13. The method of claim 1, wherein the common network resource is a radio frequency channel.

14. A comparator configured to identify locations of communication devices and correspondingly assign talk groups to maximize network resource reuse in a simulcast network, comprising:
   a transmitting component configured to transmit a location request to a plurality of communication devices in a simulcast network, wherein the location request includes timeslot assignments for each talk group of a plurality of talk groups in the simulcast network;
   a receiving component configured to receive responses from each of the plurality of communication devices indicating a location of the communication device, each response being received in a timeslot assigned to a respective one of the plurality of talk groups with which the communication device is associated; and
   a processing component configured to assign a common network resources to two or more of the plurality of talk groups determined to be geographically separated in the simulcast network based at least in part on the received responses.

15. The comparator of claim 14, wherein the transmitting component is configured to send a network access code for each talk group in the location request.

16. The comparator of claim 14, wherein the transmitting component is configured to send a present request in the location request to selected talk groups and wherein the receiving component is configured to receive a present signal from communication devices in each selected talk group, wherein each present signal is received in a timeslot associated with the selected talk group.

17. The comparator of claim 14, wherein the receiving component is configured to receive responses from communication devices associated with each talk group when a signal strength indicator from the communication devices is above a predefined threshold.

18. The comparator of claim 14, wherein the processing component is configured to use the responses to determine that one or more particular base radios are not being used by any of the communication devices associated with a particular talk group assigned to the one or more base radios, and responsively disabling the one or more particular base radios.

19. The comparator of claim 14, wherein the transmitting component is configured to transmit status symbols to base radios in sub-sites bordering one or more sub-sites assigned to the talk group.

20. The comparator of claim 14, wherein the common network resource is a radio frequency channel.

* * * * *